(12) United States Patent
Jensen et al.

(10) Patent No.: US 9,164,170 B2
(45) Date of Patent: Oct. 20, 2015

(54) SYSTEMS AND METHODS FOR AUTOTILTING A GROUND-MAPPING RADAR

(71) Applicant: Honeywell International Inc., Morristown, NJ (US)

(72) Inventors: Robert Jensen, Renton, WA (US); Camilo Mandujano, Bothell, WA (US); Jeffrey A Hester, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 318 days.

(21) Appl. No.: 13/741,306

(22) Filed: Jan. 14, 2013

(65) Prior Publication Data

US 2014/0197985 A1    Jul. 17, 2014

(51) Int. Cl.
  *G01S 13/90* (2006.01)
  *G01S 7/40* (2006.01)
(52) U.S. Cl.
  CPC .............. *G01S 13/90* (2013.01); *G01S 7/4026* (2013.01)
(58) Field of Classification Search
  CPC .......... B60Q 1/34; G01S 13/90; G01S 7/4026
  USPC ...................................................... 342/25 A
  See application file for complete search history.

(56) References Cited

U.S. PATENT DOCUMENTS

| 3,446,903 | A | * | 5/1969 | Beizer Boris ..................... 434/2 |
| 6,236,351 | B1 | | 5/2001 | Conner et al. |
| 2005/0104763 | A1 | | 5/2005 | Hall et al. |
| 2010/0109935 | A1 | * | 5/2010 | Bon et al. ........................ 342/29 |

FOREIGN PATENT DOCUMENTS

JP    2003302466 A    10/2003

OTHER PUBLICATIONS

Response to Examination Report dated Apr. 1, 2014, from counterpart European Application No. 13197576.5, filed Jul. 6, 2014, 12 pp.
Search Report from counterpart European Application No. 13197576.5, dated Mar. 5, 2014, 3 pp.
Examination Report from counterpart European Application No. 13197576.5, dated Apr. 1, 2014, 4 pp.

* cited by examiner

*Primary Examiner* — Timothy A Brainard
(74) *Attorney, Agent, or Firm* — Shumaker & Sieffert, P.A.

(57) ABSTRACT

Systems and methods that utilize a terrain database to find the elevation of the ground in the area of ground-mapping illumination to optimize the tilt of a ground-mapping antenna. An exemplary system located on a host aircraft includes a memory that stores terrain elevation data and a component that provides height, position, and orientation information of the host aircraft. A processor receives the height, the position, and the orientation information; defines a desired terrain area to be mapped, based on the received information; retrieves terrain elevation data from the memory, based on the desired terrain area to be mapped; and calculates at least one tilt angle for a ground-mapping radar function based on the retrieved terrain height value and the aircraft's height, position, and orientation information. One or more actuators is commanded to move an antenna based on the calculated at least one tilt angle.

12 Claims, 4 Drawing Sheets

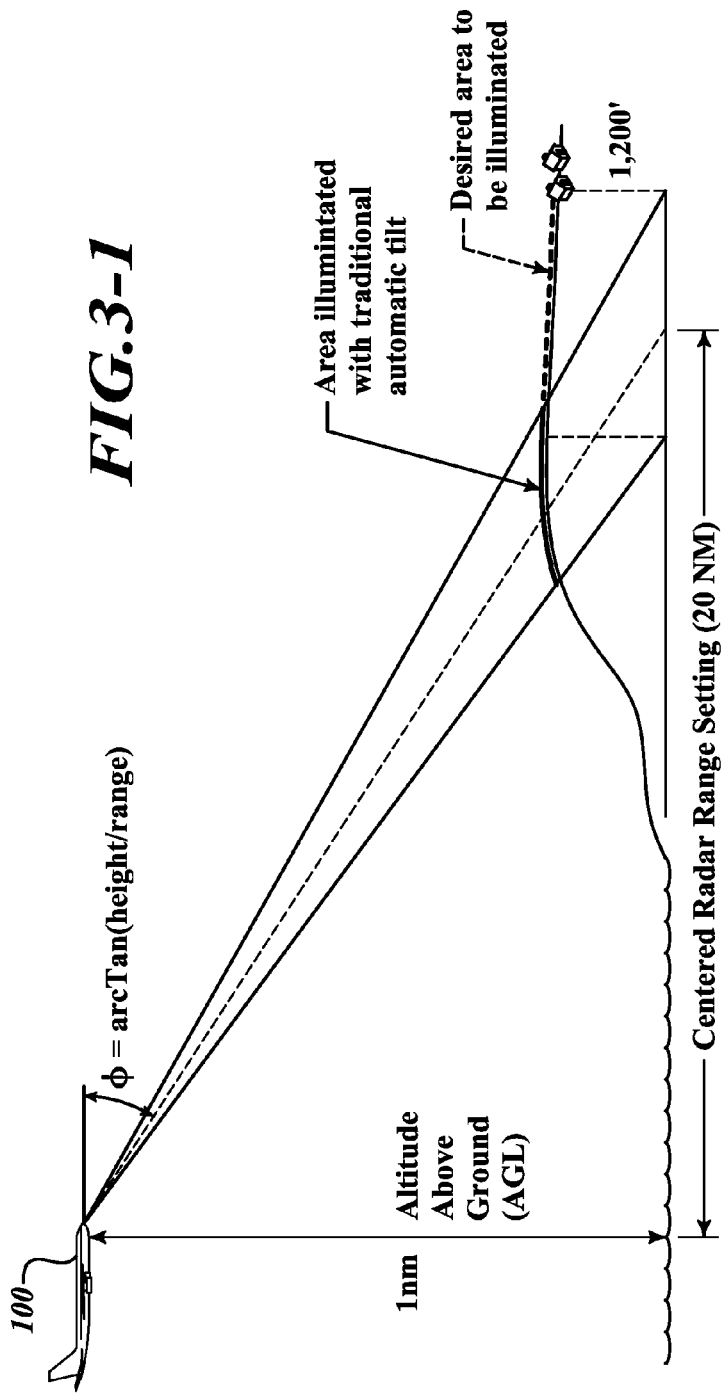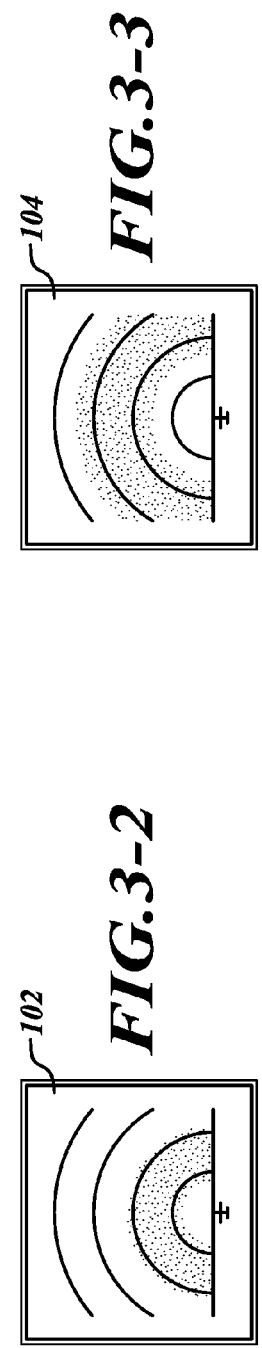

SYSTEMS AND METHODS FOR AUTOTILTING A GROUND-MAPPING RADAR

BACKGROUND OF THE INVENTION

Ground-mapping radar involves user management of the tilt of the antenna to optimize the area of the ground illuminated by the radar beam. To reduce operator workload, automatic means of adjusting the tilt have been developed that utilize the aircraft's altitude and the range selection of the radar. This calculation assumes a flat earth referenced to aircraft altitude above terrain but does not consider the differences between the terrain below the aircraft and the terrain being mapped. Thus, over widely varying terrain, the radar beam is not optimally illuminating the desired surface.

SUMMARY OF THE INVENTION

The present invention provides systems and methods that utilize a terrain database to find the elevation of the ground in the area of ground-mapping illumination to optimize the tilt of a ground-mapping antenna. This provides the operator with a true automatic tilt mode for ground-mapping applications.

An exemplary system located on a host aircraft includes a memory that stores terrain elevation data and a component that provides height, position, and orientation information of the host aircraft. A processor receives the height, the position, and the orientation information of the host aircraft from the at least one component; defines a desired terrain area to be mapped, based on the received host aircraft's height, position, and orientation information; retrieves terrain elevation data from the memory, based on the desired terrain area to be mapped; and calculates at least one tilt angle for a ground-mapping radar function, based on the retrieved terrain height value and the aircraft's height, position, and orientation information. An antenna tilt system includes one or more actuators to move an antenna, based on the calculated at least one tilt angle.

In one aspect of the invention, the processor defines the desired terrain area, based on a predefined azimuth range value and a predefined tilt range value.

In another aspect of the invention, the processor determines an average terrain height value of the retrieved terrain elevation data and calculates the at least one tilt angle, further based on the determined average terrain height value.

In yet another aspect of the invention, the antenna illuminates the ground after having been moved by the one or more actuators, the processor generates a ground-mapping image based on signals received from the antenna, and a display device presents the generated ground-mapping image.

In one aspect of the invention, tilt adaption is optimized once for each scan or optimized dynamically across an entire scan.

BRIEF DESCRIPTION OF THE DRAWINGS

Preferred and alternative embodiments of the present invention are described in detail below with reference to the following drawings:

FIGS. 3-1 through 3-3 show a first scenario of how the present invention operates with higher target terrain than with terrain under an aircraft; and FIGS. 4-1 through 4-3 show a second scenario of how the present invention operates with lower target terrain than with terrain under an aircraft.

DETAILED DESCRIPTION OF THE INVENTION

Figure 1:
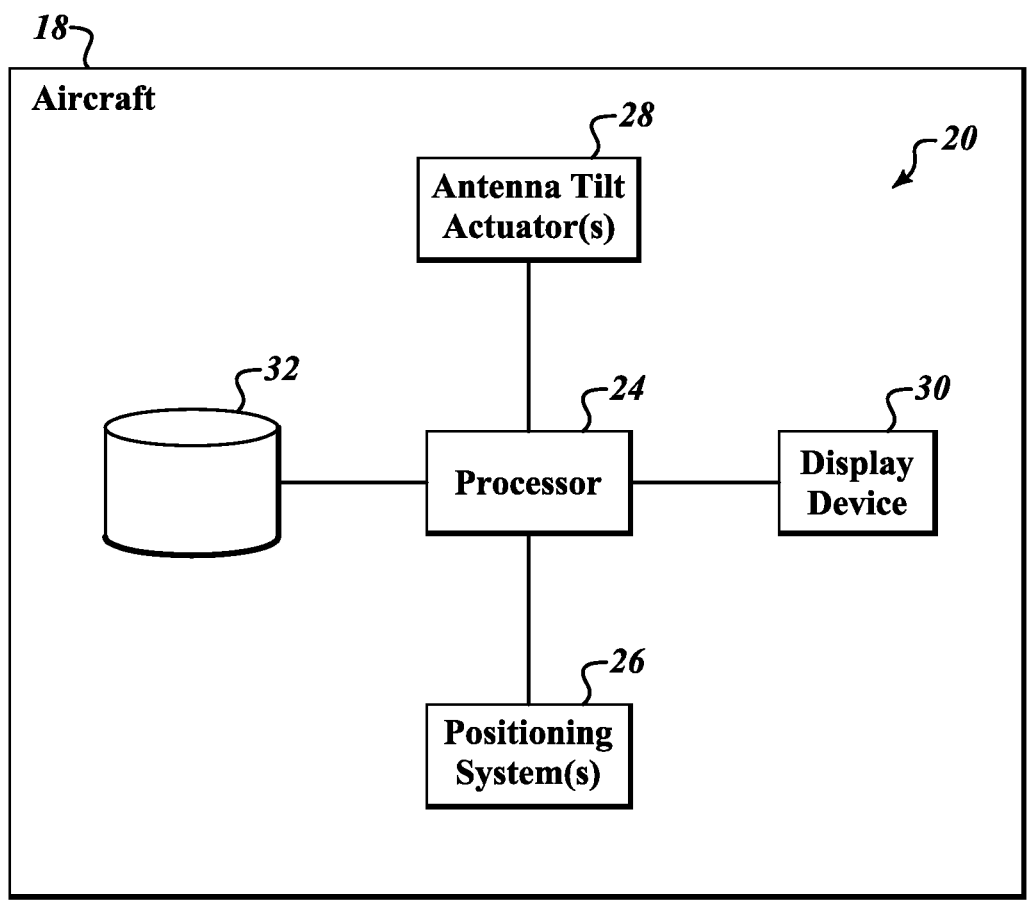
FIG. 1 is a block diagram of an exemplary system formed in accordance with an embodiment of the present invention.

FIG. 1 shows an aircraft 18 having an exemplary system 20 for implementing automatic tilt control. Other possible architectures will be readily apparent to those of ordinary skill in the art. The system 20 includes a tilt control computer (processor) 24, an antenna tilt actuator(s) 28, a positioning system(s) 26, a memory device 32, and one or more display systems 30 (such as an electronic flight information system (EFIS)). The tilt control processor 24 computes antenna tilt angle based on aircraft position information received from the positioning system 26 and terrain elevation information retrieved from a terrain elevation database stored in the memory device 32.

Figure 2:
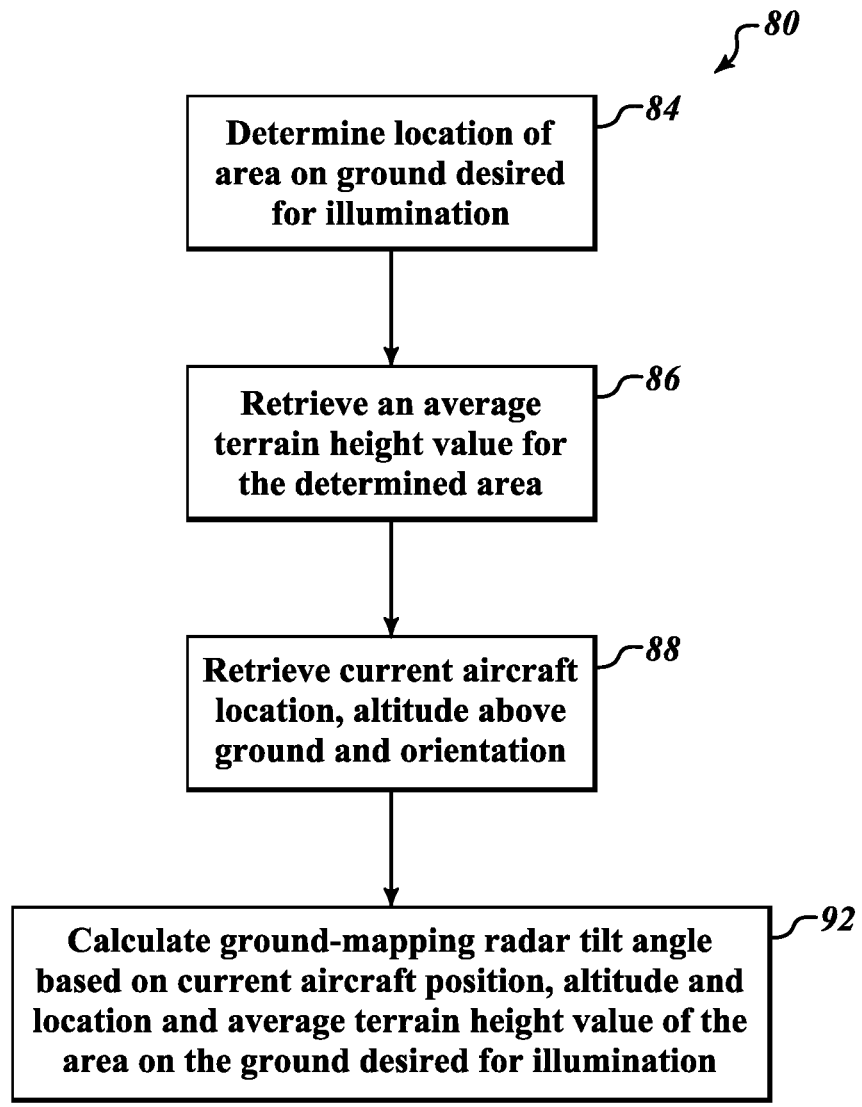
FIG. 2 is a flow diagram of an exemplary process performed by the system shown in FIG. 1.

FIG. 2 shows an exemplary process 80 performed by the system 20. First, at a block 84, a scan area of the ground desired for illumination is determined, using aircraft position and altitude information received from the position system(s) 26. The scan area is defined by a predefined sector dimension (e.g., 10° angle of antenna scan height), start and end range values, and/or starting angle and ending angle. Then, at a block 92, the processor 24 calculates ground-mapping radar tilt angles based on the aircraft's current position, altitude, and location and average terrain height value of the scan area. The process 80 is repeated for other scan areas. During an antenna scan the tilt for each sector is adjusted according to the calculated values (aircraft position/attitude and terrain height of target area/sector).

Figures 1, 4:
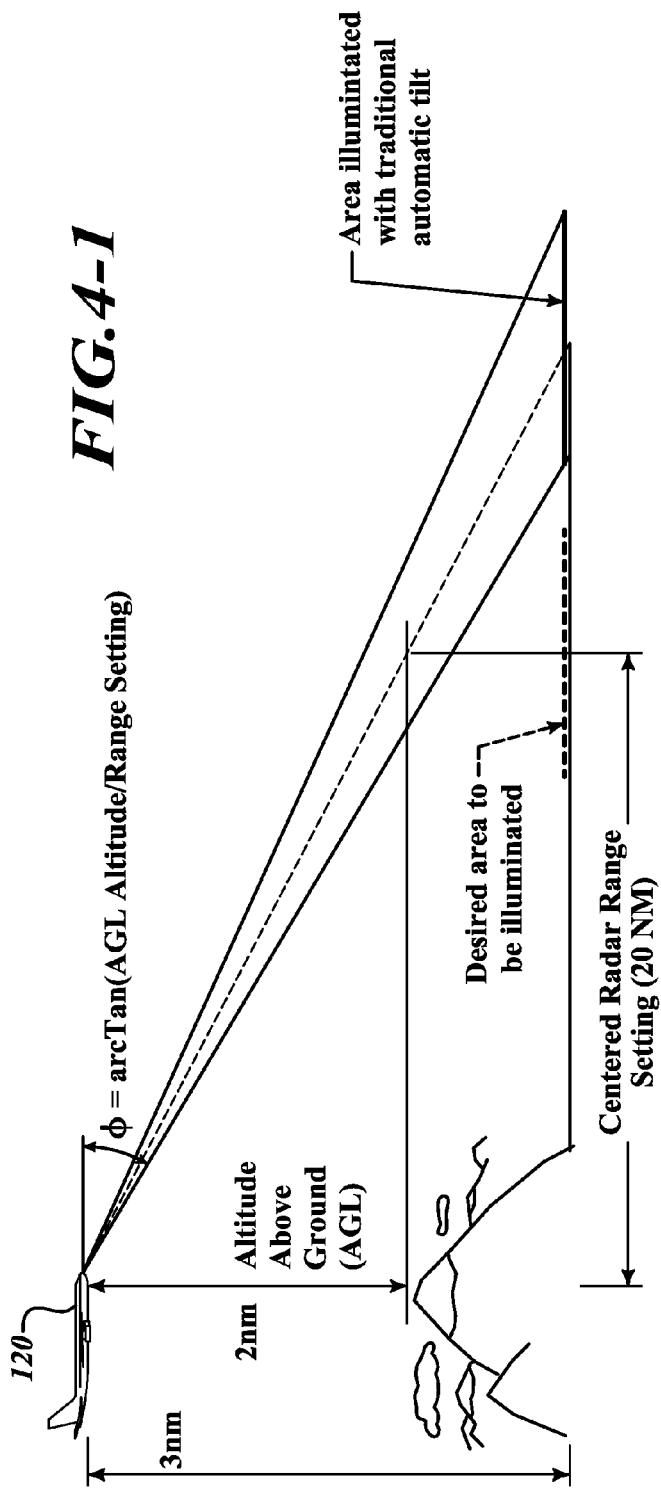
Figures 2, 4:
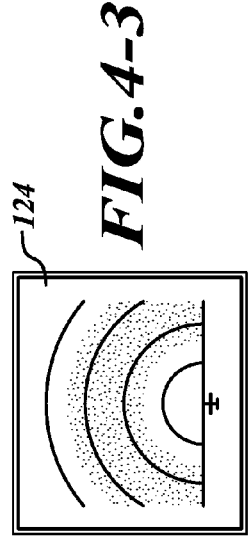
Figures 3, 4:
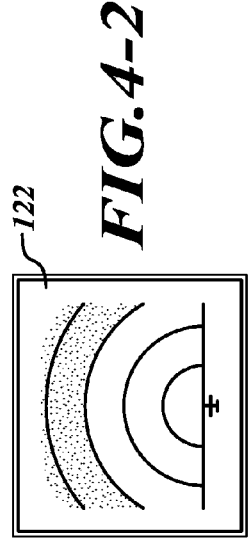

FIG. 3-1 shows an exemplary situation with an aircraft 100 flying at 6,076 feet (1 nm). The desired area to be illuminated is at a range of 20 nm. In a traditional automatic tilt calculation:

Downward Tilt angle=arcTan($^1/_{20}$)=2.9°

The negative tilt angle just means degrees below the horizon (degrees down). If the ground level at 20 nm is 1,200 feet higher than the above ground level (AGL) value of the aircraft, optimal calculated tilt is:

Downward Tilt angle=arcTan ($^{0.8}/_{20}$)=2.3°

FIG. 3-2 shows a ground-mapping radar display 102 for the traditional tilt (−2.9°). FIG. 3-3 shows a ground-mapping radar display 104 for the optimally calculated tilt (−2.3°). In this case, the traditional automatically calculated tilt is 0.6 degrees lower than the optimal tilt.

FIG. 4-1 shows an exemplary situation with an aircraft 120 flying over mountains at 18,228 feet (3 nm) mean sea level (MSL), but only 12,152 feet (2 nm) AGL. The desired area to be illuminated is at a range of 20 nm. In a traditional automatic tilt calculation using the AGL of the aircraft 120:

Downward Tilt angle=arcTan($^2/_{20}$)=5.7°

FIG. 4-2 shows a ground-mapping radar display 122 when the downward tilt is set at 5.7°.

Because ground level at 20 nm is 6,076 feet (1 nm) lower than the AGL level of the aircraft, the optimal tilt is:

Downward Tilt angle=arcTan ($^3/_{20}$)=8.5°

In this case, the traditional automatically calculated tilt is 2.8 degrees too high from the optimal tilt. FIG. 4-3 shows a ground-mapping radar display 124 at the optimal setting.

The aircraft position information may come from a variety of different sources, for example, a global position system (GPS), an inertial reference system (INS) and/or an air data system (ADS) (i.e., pitch, roll, and yaw sensors).

While the preferred embodiment of the invention has been illustrated and described, as noted above, many changes can be made without departing from the spirit and scope of the invention. For example, a portion of the data received by the processor 24 may come from an external source or the tilt control information may come from an external source. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   at a processor,
      receiving height, position, and orientation information of a host aircraft;
      defining a desired terrain area to be mapped based on the received height, position, and orientation information of the host aircraft;
      retrieving terrain elevation data from a memory device for the desired terrain area to be mapped; and
      calculating at least one tilt angle for a ground-mapping radar function based on the retrieved terrain elevation data for the desired terrain area to be mapped and the height, position, and orientation information of the host aircraft; and
   at a radar tilt system coupled to a ground-mapping antenna, moving the ground-mapping antenna based on the calculated at least one tilt angle.

2. The method of claim 1, wherein defining the desired terrain area to be mapped comprises defining the desired terrain area based on a predefined azimuth range value and a predefined tilt range value.

3. The method of claim 1, further comprising, at the processor, determining an average terrain height value of the retrieved terrain elevation data, wherein calculating the at least one tilt angle is further based on the determined average terrain height value.

4. The method of claim 1, further comprising, controlling the ground-mapping antenna to illuminate ground after having been moved, the method further comprising:
   at the processor, generating a ground-mapping image based on signals received from the ground-mapping antenna; and
   at a display device, presenting the generated ground-mapping image.

5. A system comprising:
   a memory configured to store terrain elevation data;
   at least one component configured to provide height, position, and orientation information of a host aircraft;
   a processor configured to:
      receive the height, the position, and the orientation information of the host aircraft from the at least one component,
      define a desired terrain area to be mapped, based on the received height, position, and orientation information of the host aircraft, retrieve terrain elevation data from the memory, based on the desired terrain area to be mapped, and
      calculate at least one tilt angle for a ground-mapping radar function based on the retrieved terrain height value and the height, position, and orientation information of the host aircraft; and
   an antenna tilt system comprising a ground-mapping antenna and one or more actuators configured to move the ground-mapping antenna based on the calculated at least one tilt angle.

6. The system of claim 5, wherein the processor defines the desired terrain area based on a predefined azimuth range value and a predefined tilt range value.

7. The system of claim 5, wherein the processor is further configured to determine an average terrain height value of the retrieved terrain elevation data, and calculate the at least one tilt angle based on the determined average terrain height value.

8. The system of claim 5, further comprising a display device, wherein the ground-mapping antenna is configured to illuminate ground after having been moved by the one or more actuators, and wherein the processor is further configured to generate a ground-mapping image based on signals received from the ground-mapping antenna, and display, via the display device, the generated ground-mapping image.

9. A system comprising:
   a means for receiving height, position, and orientation information of a host aircraft;
   a means for defining a desired terrain area to be mapped, based on the received height, position, and orientation information of the host aircraft;
   a means for retrieving terrain elevation data from a memory device for the desired terrain area to be mapped;
   a means for calculating at least one tilt angle for a ground-mapping radar function based on the retrieved terrain elevation data for the desired terrain area to be mapped and the height, position, and orientation information of the host aircraft; and
   a means for moving a ground-mapping antenna based on the calculated at least one tilt angle.

10. The system of claim 9, wherein the means for defining defines the desired terrain area based on a predefined azimuth range value and a predefined tilt range value.

11. The system of claim 9, further comprising:
   a means for determining an average terrain height value of the retrieved terrain elevation data, wherein the means for calculating the at least one tilt angle calculates the at least one tilt angle based on the determined average terrain height value.

12. The system of claim 9, wherein the ground-mapping antenna illuminates ground after having been moved, the system further comprising:
   a means for generating a ground-mapping image based on signals received from the ground-mapping antenna; and
   a means for presenting the generated ground-mapping image.

* * * * *